United States Patent [19]

Corti et al.

[11] Patent Number: 4,526,465

[45] Date of Patent: Jul. 2, 1985

[54] APPARATUS FOR DETECTING THE DISPLACEMENTS OF POINTS OF EXCITED STRUCTURES

[75] Inventors: Mario Corti, Segrate; Fulvio Parmigiani, Cremona, both of Italy

[73] Assignee: CISE-Centro Informazioni Studi Esperienze S.p.A., Milan, Italy

[21] Appl. No.: 356,534

[22] Filed: Mar. 9, 1982

[30] Foreign Application Priority Data

Mar. 23, 1981 [IT] Italy ............................. 20666 A/81

[51] Int. Cl.³ .............................................. G01B 9/02
[52] U.S. Cl. ..................................... 356/35.5; 73/657; 356/358
[58] Field of Search ...................... 356/1, 4, 4.5, 35.5, 356/349, 357, 358, 28, 28.5, 359, 360; 73/655, 657

[56] References Cited

U.S. PATENT DOCUMENTS

| | | | |
|---|---|---|---|
| 3,471,238 | 10/1969 | Hawke | 73/657 X |
| 3,854,325 | 12/1974 | Coate | 73/657 X |
| 4,123,166 | 10/1978 | Botcherby et al. | 350/6.3 X |
| 4,123,167 | 10/1978 | Botcherby et al. | 350/6.3 X |
| 4,170,397 | 10/1979 | Botcherby et al. | 350/6.3 |

OTHER PUBLICATIONS

Denby et al., "Plane-Surface Strain Examination by Speckle-Pattern Interferometry, Using Electronic Processing", *J. Strain Analysis* vol. 9, No. 1, pp. 17-25, 1974.

Schwiesow et al., "Coherent Differential Doppler Measurements of Transverse Velocity at a Remote Point", *Applied Optics,* vol. 16, No. 5, pp. 1145-1150, 5/77.

Vanetsian et al., "Laser Apparatus for Measuring ... " *Soviet Journal of Quantum Electronics,* vol. 1, No. 1, pp. 331-335, Feb. 1972.

Dandliker et al., "Measuring Micro-Vibrations by Heteroclyne Speckle Interferometry", *Proc. SPIE,* vol. 236, pp. 83-85, 1980.

*Primary Examiner*—Davis L. Willis
*Assistant Examiner*—Matthew W. Koren
*Attorney, Agent, or Firm*—Karl W. Flocks; Sheridan Neimark; A. Fred Starobin

[57] ABSTRACT

An apparatus for detecting the displacements of points of structures which are excited either by artificially or naturally produced forces comprises, in combination:
coherent-light vibration-sensing means composed of at least one group of two laser-beam interferometers focused at a common target point of a structure;
angle-sensing means rigidly connected to the interferometers of at least either group, and
means for processing the interferometric data coming from said vibration-sensing means and the angular data coming from said angle-sensing means.

8 Claims, 2 Drawing Figures

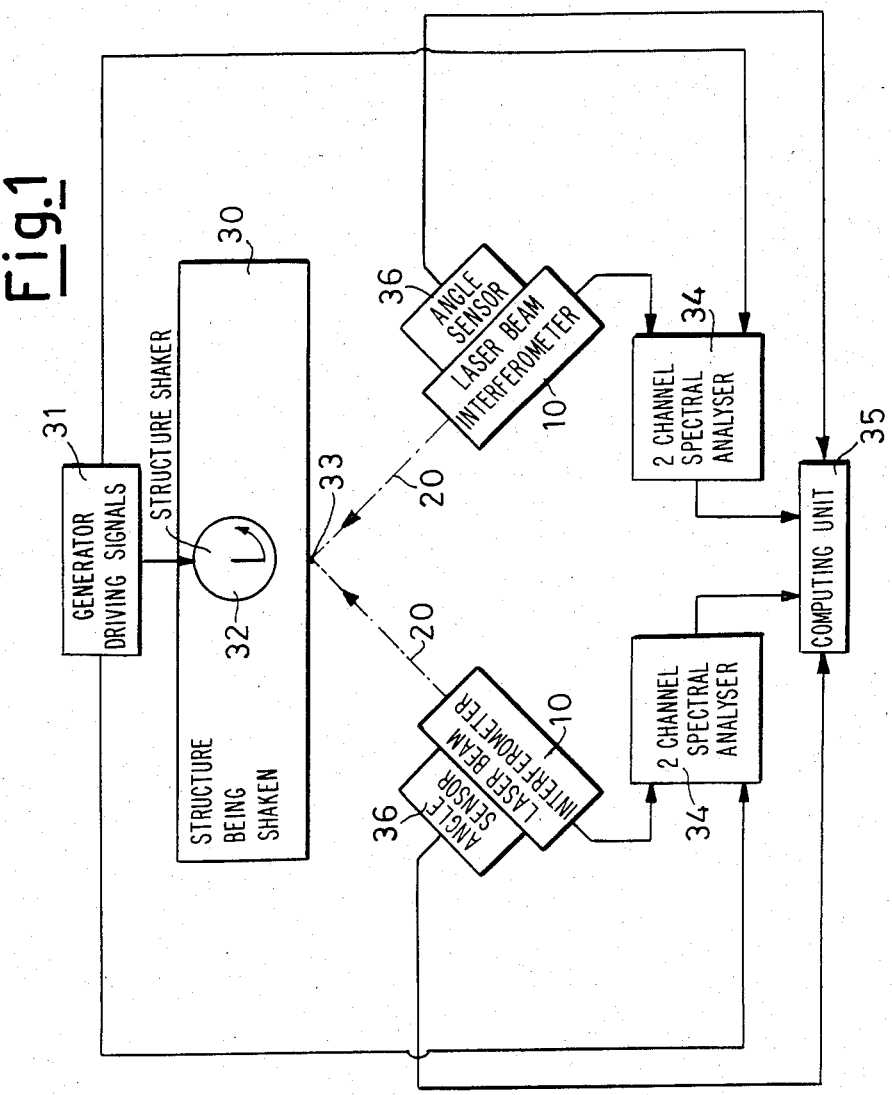

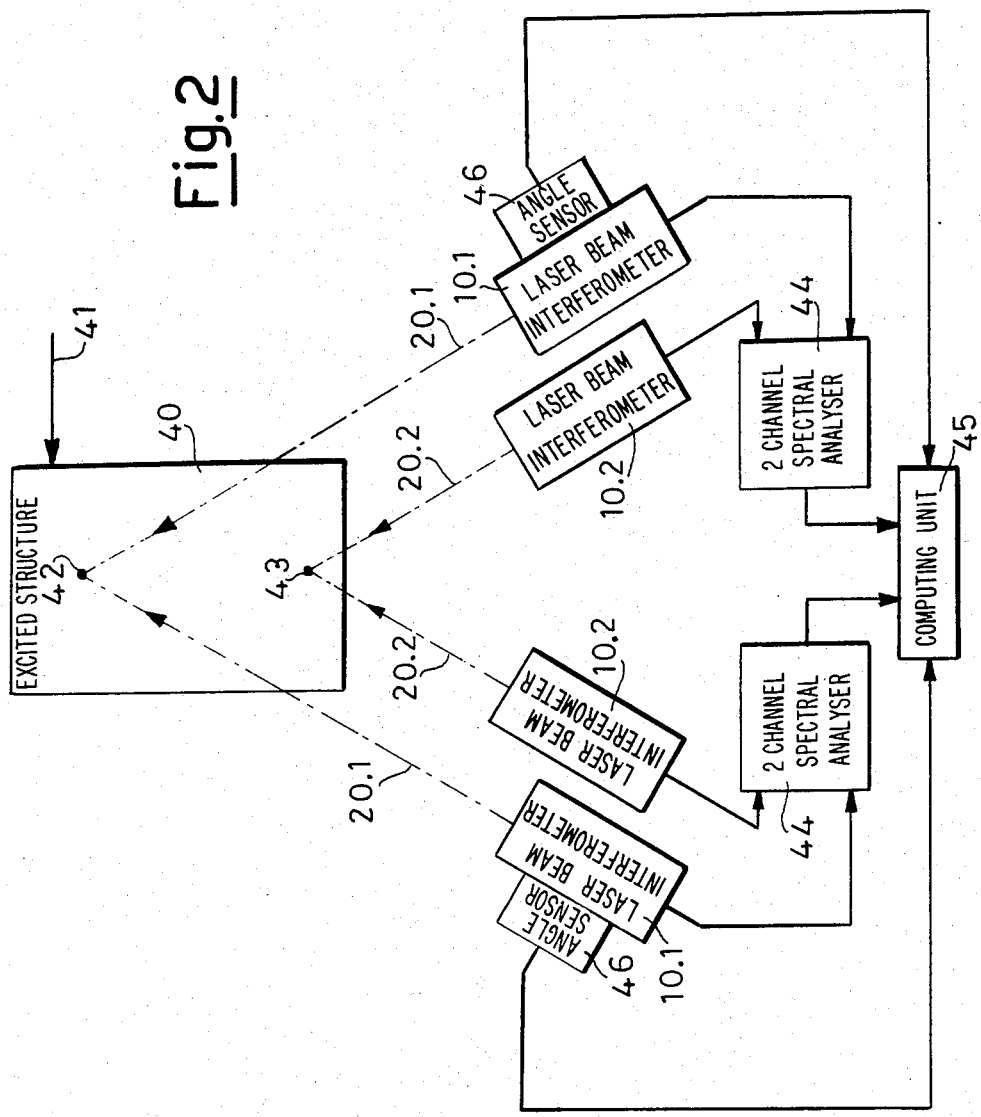

APPARATUS FOR DETECTING THE DISPLACEMENTS OF POINTS OF EXCITED STRUCTURES

This invention relates to an apparatus which exploits vibration-sensors for detecting the displacements of points of structures which are excited either by artificially produced forces or by naturally occurring forces. Such structures may be, for example, large sized civil constructions such as dams, industrial structures such as chimneys and dwelling buildings such as palaces and the like.

A number of apparatus are known which perform dynamic analyses of excited structures, which are artificially shaked to this purpose, or which are naturally shaked by a naturally occurring micro-seismic phenomenon.

These conventional apparatus are affected by certain shortcomings.

As a matter of fact, the vibration-sensors acting therein, which are usually of the piezo-electric or the electromagnetic type, are bulky and their setting in position and calibration are so difficult as to make the measurements difficult to obtain, if not even possible. This fact occurs, especially in the case of simultaneous measurements of both tangential and radial displacements of the excited structure concerned.

In addition, these apparatus very often modify the mechanical properties of the system being measured.

An object of the present invention is to do away with the drawbacks enumerated above for the conventional procedures.

Such an object is achieved by providing an apparatus for detecting the displacements of points of excited structures, which is characterized in that it comprises, in combination:

coherent-light vibration-sensing means composed of at least one group of two laser-beam interferometers focused at a common target point of a structure;

angle-sensing means rigidly connected to the interferometers of at least either group, and means for processing the interferometric data coming from said vibration-sensing means and the angular data coming from said angle-sensing means.

In order that the features and the advantages of the present invention may best be understood, two exemplary embodiments thereof will now be described hereinafter without any implied limitations and illustrated in the accompanying drawings, wherein:

FIG. 1 is a block diagram showing an apparatus according to the invention for detecting the displacements of the points of a structure which is shaked by artificially-produced forces, and FIG. 2 is a block diagram showing an alternative embodiment of the apparatus according to the invention for detecting the displacements of the points of a structure which is shaked by naturally occurring forces.

The apparatus according to this invention, as shown in the block diagrams of FIGS. 1 and 2, exhibit a repetitive basic configuration which consists of a laser-beam interferometer 10, which projects a coherent-light beam to a target point integral with a structure and compares the back scattered light with a local oscillator in order to produce by a photodiode an electric signal which contains the wanted informations.

The laser-beam interferometer 10 is of the kind disclosed in the U.S. Pat. Nos. 4,123,166, 4,123,167 and 4,170,397.

In the block diagram of FIG. 1 an apparatus according to this invention is shown, which is adapted to measure the radial and the tangential displacements of the points of a structure 30, which is shaked by harmonic forced oscillations having a properly preselected frequency and magnitude.

The block diagram shows:

a generator 31 for generating driving signals, which sends a signal of that kind to a device 32 for shaking the structure, the magnitude and the frequency being variable;

two laser-beam interferometers 10 of the kind referred to above, which are movable and each of which projects a coherent-light beam 20, to a target point 33, common to both interferometers, on the structure 30;

two angle-sensing means 36, each of which is integral with either interferometer 10 and has its output connected to a computing unit 35;

two 2-channel spectral analysers, 34, each of which receives at its input the output signal of either interferometer 10 as well as the output signal of the generator 31, and delivers the processed signal to the computing unit 35.

In order to carry out the measurements of the radial and the tangential movements of the point 33, during a first stage, the topographic positions of each interferometer 10 relative to a reference system are determined by the usual triangulation procedures.

During a second stage, the coordinates of the target point 33 relative to the reference system are determined, by using as the sighting tracers the laser beams 20 of the two interferometers 10 and processing the aforesaid topographic positions of the interferometers 10 with the angular data supplied by the two sensors 36, with the aid of the computing unit 35.

A subsequent step is to actuate the generator 31, which, in its turn, drives the device 32 so as vibratorily to stress the structure 30 with a force which has the magnitude and the frequency as desired by the operator.

Each interferometer 10 delivers to the computing unit 35, via the corresponding spectral analyser 34, a signal having a voltage which is proportional to the geometrical projection of the displacement of the point 33 on the direction of propagation of the interferometer beam.

The data which have reached the computing unit 35 enable one to obtain the information on the radial and tangential displacements of the target point 33, and, moreover, they also provide the relative phase angle of the latter relative to the driving signal. As a matter of fact, the delivery of the exciting output signal by the generator 31 to the spectral analysers 34 enables the computing unit 35 to supply such a phase data, in addition to improving the signal to noise ratio.

The information supplied by the computing unit 35 can then be processed, for example, graphically, so as better to display the displacements of the target point 33.

By taking repeated readings of the vibrations for a number of properly selected points of the structure 30, it is possible to assess the overall behavior of the structure when excited.

In order to be enabled to selected the mode frequency for stressing the structure 30, the structure in question is shaked, immediately after the surveying operations stage, with a force the frequency of which is slowly variable. The frequencies which correspond to the peaks of the amplitude spectrum thus obtained correspond to the resonance frequencies of the symmetrical and the antisymmetrical modes. In order not to lose sight possible resonance frequencies, it is advisable to repeat the measurements in a number of target points of the structure, selected, if possible, far from the nodal points.

Should it be desired to known, in addition to the radial and the tangential displacements, also the vertical displacements of the target point, it is sufficient, to add a third coherent-light interferometer 10, with an attendant angle-sensing device 36 and a spectral analyser 34, to achieve the purpose. The operation is entirely similar to what has been described hereinabove.

The block-diagram of FIG. 2 shows another device according to the invention, which is adapted to measure the radial and the tangential displacements of a structure 40, which is excited by a random force 41, such as, for example, the wind.

Such block diagram shows:
four laser-beam interferometers 10, of the kind referred to above: two of them, indicated at 10.1, which lie outside the FIG. 2, send two corresponding coherent-light beams 20.1 to a target point 42, common to both interferometers and lying on the structure 40, said beams being so movable as to be able to hit other points of the structure 40, whereas the remaining two interferometers, indicated at 10.2 which lie within the field of FIG. 2, send two corresponding coherent-light beams 20.2, to a second common target point 43 on the structure 40, the latter interferometers being fixed in space;

two angle-sensing devices 46, each of which is integral with either of the two interferometers 10.1 and has its output connected to a computing unit 45;

two 2-channel spectral analysers 44, each of which receives at its input end, the output signals of either interferometer 10.1 and of the adjoining interferometer 10.2 and delivers the processed signal to a computing unit 45.

Each couple of light beams 20.2 lies on the same horizontal plane, whereas each couple of light beams 20.1-20.2 lies on the same vertical plane.

Similarly to what has been indicated above, each interferometer 10.1 delivers, via the corresponding spectral analyser 44 (frequencies correlator), to the computing unit 45, a voltage signal which is proportional to the geometrical projection of the displacement of the target point 42 relative to a reference system.

Differently from what occurred with the device shown in FIG. 1, the output signal of each interferometer 10.1 is correlated, in the spectral analyser 44, with the output signal of the adjoining interferometer 10.2, the beam of which, 20.2 is fixed upon the point 43, so as to obtain the transfer function between the point 42 and the point 43.

The amplitude of the peaks of the transfer function relative to the resonance frequencies and their corresponding phases give a vector which is proportional to the movement of the point 42 normalized relative to the point 43. The data reaching the computing unit 45 permit that the information may be obtained which is relative to the displacements, both radial and tangential, and to the corresponding phase angle, of the point 42 normalized relative to the point 43.

Still in the same way as explained for the device of FIG. 1, the information obtained from the computing unit 45 can be graphically processed to get a better display of the displacements of the target point 42. Moreover, if it is also desired to obtain, in addition to the radial and the tangential displacements of the target point, the vertical displacements thereof, it is sufficient to add another couple of interferometers 10.1 and 10.2 with a corresponding angle-sensing device 46 integrally secured to the interferometer 10.1 and a corresponding spectral analyser 44 having its input connected to the outputs of the two interferometers.

We claim:
1. An apparatus for detecting the displacements of points of stressed structures, characterized in that it comprises, in combination:
coherent-light vibration-sensing means composed of at least one group of two laser-beam interferometers of the type to measure a vibration component along a respective axis focused at a common target point of the structure;
angle-sensing means rigidly connected to the interferometers of at least either group for determining the orientation of each said axis, and,
means for processing the measured vibration component data coming from said vibration-sensing means and the angular data coming from said angle-sensing means to compute the displacement of said target.

2. An apparatus according to claim 1, characterized in that said coherent-light vibration-sensing means consist of two movable laser-beam interferometers focused at a common target point of said structure.

3. An apparatus according to claim 2, characterized in that each interferometer is rigidly secured to an angle-sensing means.

4. An apparatus according to claim 3, characterized in that each interferometer has its output connected to a computing unit via a spectral analyser, said computing unit having also the output of the respective angle-sensing means connected thereto.

5. An apparatus according to claim 4, characterized in that each spectral analyzer has its input connected to the output of a driving-signal generator connected, in its turn, to an artificial stressing means for said structure for shaking the same with a force having variable magnitude and frequency, said processing means also computing phase data of the displacement of said target with respect to said output of a driving-signal generator.

6. An apparatus according to claim 1, characterized in that said coherent-light vibration-sensing means consist of four laser-beam interferometers, two of which are focused at a common target point and are fixed in space, the remaining two interferometers being focused at another common target point and are movable.

7. An apparatus according to claim 6, characterized in that an angle-sensing device is rigidly secured to each of at least two of said interferometers.

8. An apparatus according to claim 7, characterized in that each of the two couples composed of a movable and a fixed interferometer has its output connected to a computing unit via a spectral analyser, the respective angle-sensing means having its output also connected to said computing unit.

* * * * *